United States Patent
Heo et al.

(10) Patent No.: US 10,403,013 B2
(45) Date of Patent: Sep. 3, 2019

(54) IMAGE PROCESSING METHOD FOR INCREASING CONTRAST BETWEEN USER INTERFACE LAYERS AND ELECTRONIC DEVICE FOR SUPPORTING THE SAME

(71) Applicant: Samsung Electronics Co., Ltd., Gyeonggi-do (KR)

(72) Inventors: Yoon Jeong Heo, Gyeonggi-do (KR); Jee Yeun Wang, Seoul (KR); Kyung Dae Park, Seoul (KR); Hyung Min Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 29 days.

(21) Appl. No.: 15/042,575

(22) Filed: Feb. 12, 2016

(65) Prior Publication Data

US 2016/0239992 A1 Aug. 18, 2016

(30) Foreign Application Priority Data

Feb. 13, 2015 (KR) .................. 10-2015-0022740

(51) Int. Cl.
- *G06K 9/46* (2006.01)
- *G06T 11/00* (2006.01)
- *G06T 11/60* (2006.01)

(52) U.S. Cl.
CPC ............ *G06T 11/60* (2013.01); *G06K 9/4652* (2013.01); *G06T 11/001* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,793,345 A * | 8/1998 | Silverbrook | G02F 1/133514 345/695 |
| 8,441,499 B2 | 5/2013 | Heynen et al. | |
| 8,823,728 B2 | 9/2014 | Jones et al. | |
| 2008/0137159 A1* | 6/2008 | Lim | G06T 11/001 358/520 |
| 2008/0163060 A1* | 7/2008 | Shepard | G06F 3/14 715/723 |
| 2008/0267443 A1* | 10/2008 | Aarabi | G06K 9/00234 382/100 |

(Continued)

OTHER PUBLICATIONS

W3C: G18: Ensuring that a contrast ratio of at least 4.5:1 exists between text (and images of text) and background behind the text, Dec. 17, 2008, pp. 1-2, XP002699980, http://web.archive.org/web/20081217141248/http://www.w3.org/TR/WCAG20-TECHS/G18.htm.

(Continued)

*Primary Examiner* — James A Thompson
(74) *Attorney, Agent, or Firm* — Cha & Reiter, LLC

(57) ABSTRACT

A method for use in an electronic device including selecting, by the electronic device, a filtering region in a first layer of a user interface based on a position of a content item in a second layer of the user interface; applying, by the electronic device, a graphical effect to the filtering region; displaying, on a display of the electronic device, a screen that is produced by merging the first layer with the second layer after the graphical effect is applied to the filtering region.

14 Claims, 9 Drawing Sheets

(56) References Cited

U.S. PATENT DOCUMENTS

| | | | |
|---|---|---|---|
| 2008/0307342 A1* | 12/2008 | Furches | G06T 11/00 |
| | | | 715/764 |
| 2009/0254855 A1* | 10/2009 | Kretz | G06F 1/1626 |
| | | | 715/800 |
| 2011/0035552 A1 | 2/2011 | Heynen et al. | |
| 2011/0074807 A1 | 3/2011 | Inada et al. | |
| 2012/0233575 A1* | 9/2012 | Kashyap | G06F 17/5068 |
| | | | 716/55 |
| 2013/0104061 A1* | 4/2013 | Engel | G09G 3/36 |
| | | | 715/761 |
| 2013/0227448 A1 | 8/2013 | Heynen et al. | |
| 2013/0328902 A1 | 12/2013 | Grant | |
| 2013/0328910 A1 | 12/2013 | Jones et al. | |

OTHER PUBLICATIONS

European Search Report dated Jul. 19, 2016.

* cited by examiner

IMAGE PROCESSING METHOD FOR INCREASING CONTRAST BETWEEN USER INTERFACE LAYERS AND ELECTRONIC DEVICE FOR SUPPORTING THE SAME

CLAIM OF PRIORITY

This application claims the benefit under 35 U.S.C. § 119(a) of a Korean patent application filed on Feb. 13, 2015 in the Korean Intellectual Property Office and assigned Serial number 10-2015-0022740, the entire disclosure of which is hereby incorporated by reference.

TECHNICAL FIELD

The present disclosure relates to electronic devices, in general, and more particularly to an image processing method and electronic device for supporting the same.

BACKGROUND

Electronic devices, such as smartphones or tablet computers, may perform various functions such as a wireless communication function, a media output function, and an image capturing function. The electronic devices may output a variety of content items, such as images, text, and icons which are generated in a process of performing the functions, on their screens.

If a color of a content item, such as an icon and text displayed on a screen, is similar to a color of a background image, an electronic device according to the related art may have inconvenience in which a user may not be able to view the output content item easily. To solve this convenience, there are a method of securing visibility by adding a border to an icon, text, and the like or shading the periphery of text, a method of securing visibility by setting a different color for each content item, and a method of securing visibility by adding a separate layer between a background screen layer and a layer which displays content.

In these conventional methods, since the different color is assigned per content, computation loads may be increased. Alternatively, overhead may occur due to adding the layer. For this reason, the performance of electronic devices is reduced, and visibility of an output result is not improved.

SUMMARY

Aspects of the present disclosure are to address at least the above-mentioned problems and/or disadvantages and to provide at least the advantages described below.

According to aspects of the disclosure, a method is provided for use in an electronic device, comprising: selecting a filtering region in a first layer of a user interface based on a position of a content item in a second layer of the user interface; applying a graphical effect to the filtering region; displaying, on a display of the electronic device, a screen that is produced by merging the first layer with the second layer after the graphical effect is applied to the filtering region.

According to aspects of the disclosure, an electronic device is provided, comprising: a display; a memory; an image processing module; and at least one processor operatively coupled to the memory; wherein the at least one processor is configured to select a filtering region in a first layer of a user interface based on a position of a content item in a second layer of the user interface, wherein the image processing module is configured to apply a graphical effect to the filtering region; wherein the display is configured to display a screen that is produced by merging the first layer with the second layer after the graphical effect is applied to the filtering region.

According to aspects of the disclosure, a non-transitory computer-readable medium is provided comprising one or more processor-executable instructions which when executed by at least one processor cause the at least one processor to perform a method comprising the steps of: selecting a filtering region in a first layer of a user interface based on a position of a content item in a second layer of the user interface; applying a graphical effect to the filtering region; displaying a screen that is produced by merging the first layer with the second layer after the graphical effect is applied to the filtering region.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
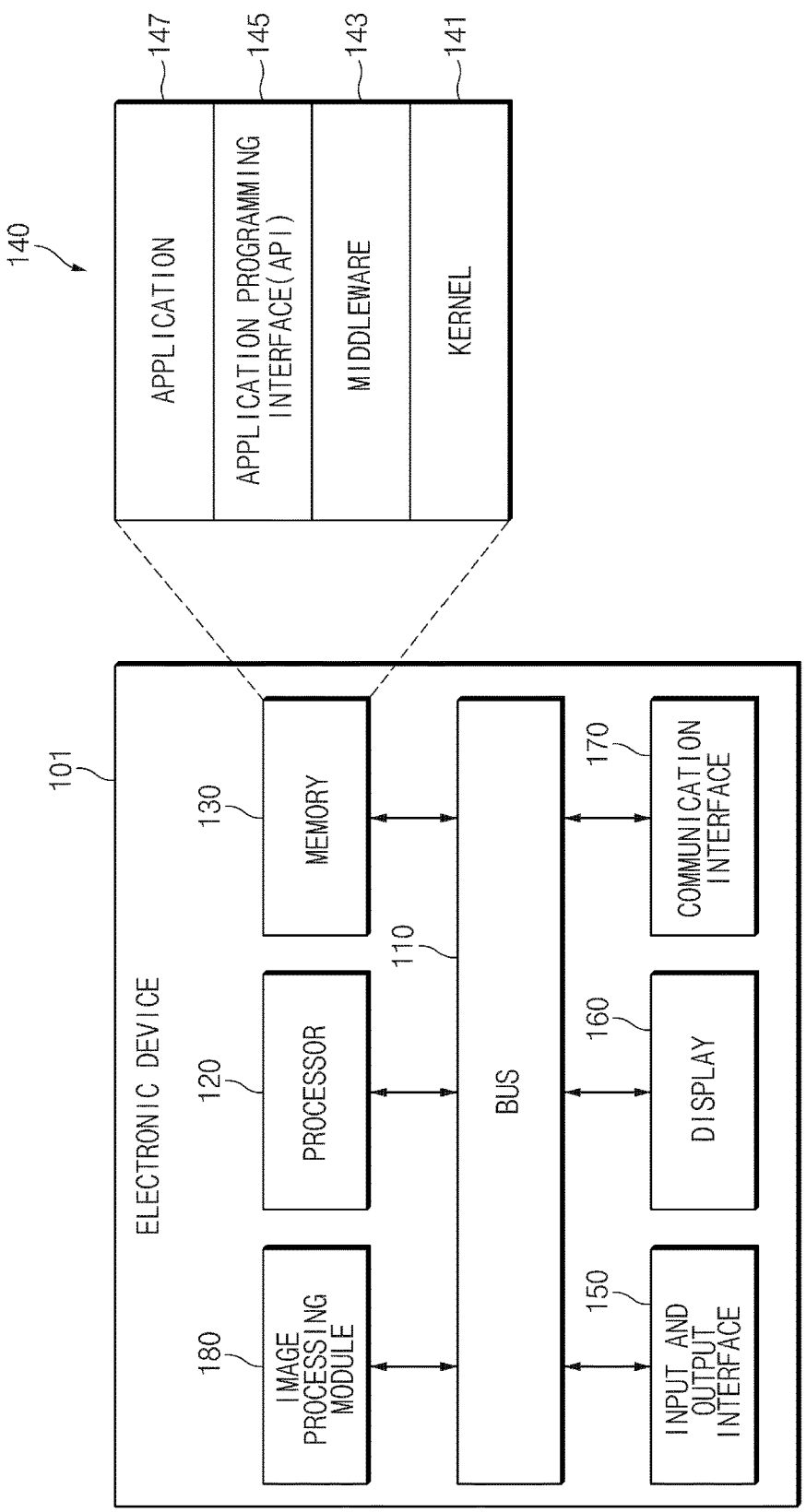
FIG. 1 is a block diagram of an example of an electronic device, according to various embodiments of the present disclosure.

Hereinafter, the present disclosure is described with reference to the accompanying drawings. Various modifications are possible in various embodiments of the present disclosure and embodiments are illustrated in drawings and related detailed descriptions are listed. However, the present disclosure is not intended to be limited to the specific embodiments, and it is understood that it should include all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Hereinafter, the electronic devices according to various embodiments of the present disclosure will be described with reference to the accompanying drawings. The term "user" used herein may refer to a person who uses an electronic device or may refer to a device (e.g., an artificial electronic device) which uses an electronic device.

FIG. 1 is a block diagram of an example of an electronic device, according to various embodiments of the present disclosure.

Referring to FIG. 1, an electronic device 101 may include a bus 110, a processor 120, a memory 130, an input and output (I/O) interface 150, a display 160, a communication interface 170 and an image processing module 180. In various embodiments of the present disclosure, at least one of the components may be omitted from the electronic device 101, and other components may be additionally included in the electronic device 101.

The bus 110 may be, for example, a circuit which may connect the components 120 to 180 with each other and may transmit communications (e.g., a control message and/or data) between the components.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In some implementations, the processor 120 may include one or more a central processing unit (CPU), an application processor (AP), and a communication processor (CP). The processor 120 may execute, for example, calculation or data processing about control and/or communication of at least another component of the electronic device 101. In various embodiments of the present disclosure, the processor 120 may perform computations for applying a filter to an underlying region of content displayed on a screen of the electronic device 101 in order to impart a graphical effect on the underlying region. Additional information about tasks performed by the processor 120 is discussed further below with reference to FIGS. 2 to 7.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. In operation, the memory 130 may include a volatile memory and/or a non-volatile memory. For example, the memory 130 may store instructions or data associated with at least another component of the electronic device 101. According to an embodiment of the present disclosure, the memory 130 may store a program 140.

The program 140 may include, for example, a kernel 141, a middleware 143, an application programming interface (API) 145, and/or an application program 147 (or "an application"). At least part of the kernel 141, the middleware 143, or the API 145 may be referred to as an operating system (OS).

The kernel 141 may control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 may provide an interface which may control or manage system resources.

The middleware 143 may play a role as, for example, a go-between such that the API 145 or the application program 147 communicates with the kernel 141 to communicate data with the kernel 141.

Also, the middleware 143 may process one or more work requests received from the application program 147 according to priority. For example, the middleware 143 may provide priority which may use system resources (the bus 110, the processor 120, or the memory 130, and the like) of the electronic device 101 to at least one of the application program 147. For example, the middleware 143 may perform scheduling or load balancing for the one or more work requests by processing the one or more work requests according to the priority provided to the at least one of the application program 147.

The API 145 may be, for example, an interface in which the application program 147 controls a function provided by the kernel 141 or the middleware 143. For example, the API 145 may include at least one interface or function (e.g., instruction) for file control, window control, image processing, or text control, and the like. Additional information about the program 140 may be provided with reference to FIGS. 2 and 9.

The input and output interface 150 may transmit instructions or data input from a user or another external device to another component (or other components) of the electronic device 101. Also, input and output interface 150 may output instructions or data received from another component (or other components) of the electronic device 101 to the user or the other external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, a variety of content items (e.g., text, images, videos, icons, or symbols, and the like) to the user. In various embodiments of the present disclosure, the display 160 may include a display driver integrated circuit (DDI). The DDI may be a circuit which converts a transmitted digital signal into a red, green, blue (RGB) analog value and transmits the RGB analog value to the display 160 and may perform a simple image processing task.

If a color of a background image output on the display 160 and a color of a content item (e.g., an icon or text, and the like) displayed on a screen are the same as or similar to each other, the content item may blend with the background, and it may be difficult to see by the user. In this case, in a process where the user uses the electronic device 101, an information transmission error, a screen touch error, and the like may be generated. According to aspects of the disclosure, the processor 120 may enhance visibility by filtering at least part of a region of a layer corresponding to a background image.

The communication interface 170 may establish communication between, for example, the electronic device 101 and an external device. For example, the communication interface 170 may connect to a network through wireless communication or wired communication and may communicate with the external device.

The image processing module 180 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. Although in the present example, the image processing module 180 and the processor 120 are depicted as separate hardware components, in some implementations the image processing module 180 and the processor 120 may be integrated together into the same unit and/or the processor 120 may be used to implement the image processing module 180.

In some implementations, the image processing module 180 may be a device which performs calculation associated with graphics. The image processing module 180 may be implemented with a hardware module (e.g., a graphics processing unit (GPU), a hardware (HW) compositor, or a field programmable gate array (FPGA) which mainly perform specific computation) or a software module (e.g., a surface flinger, a Skia, and the like).

The GPU may merge layers into one layer or may perform relatively complex graphics-related computation such as graphic computation or filter processing using an open graphic library (OpenGL). The GPU may transmit a resulting image to the display 160 to output the resulting image.

The HW compositor may perform a task of merging several images into one image to display the one image on a screen and a simple image processing task of scaling an image and changing a color type.

The FPGA may be a hardware chip separately programmed for specific computation and may perform computation such as specific filer computation.

In various embodiments of the present disclosure, the image processing module 180 may filter at least part of a region of a background image according to a filter set through the processor 120. Herein, a function performed in each of the processor 120 and the image processing module 180 may be performed in a complementary or duplicated way.

Figure 2:
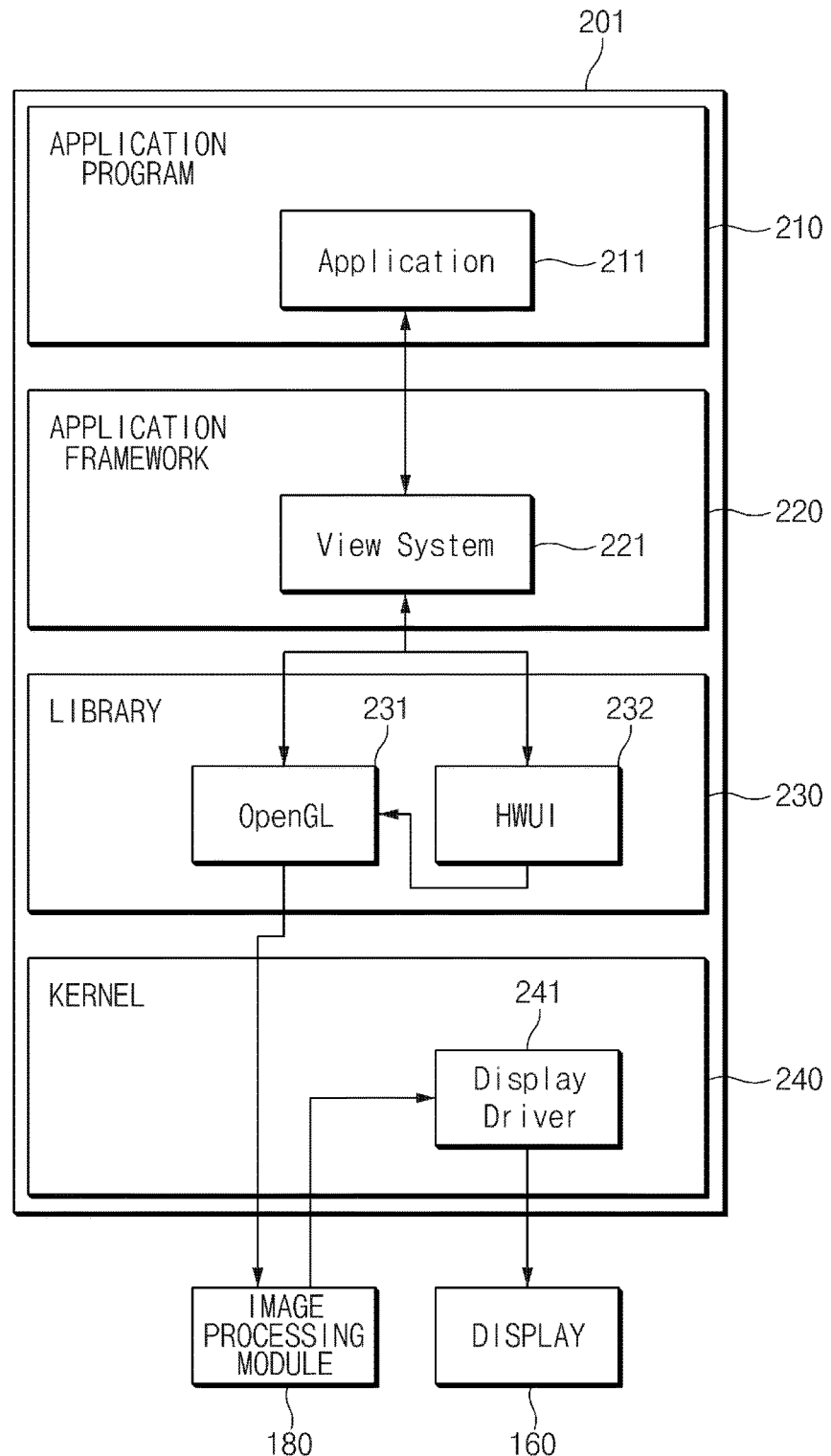
FIG. 2 is a block diagram of an example of a program module, according to various embodiments of the present disclosure.

FIG. 2 is a block diagram of an example of a program module, according to various embodiments of the present disclosure.

Referring to FIG. 2, a program module 201 (e.g., a program 140 of FIG. 1) may include an application program 210, an application framework 220, a library 230, and a kernel 240.

The application program 210 may include an application 211. The application 211 may perform various functions such as an address book function, a camera function, a diary function, and an alarm function. The one application 211 may provide various user interface screens for a user to interact with. Any of the screens may include one or more layers.

For example, the user interface of a camera application may include a background layer, an image layer, and a content layer. The background layer may be a layer which is a basic background of the camera application. The image layer may be a layer showing an image currently captured through a camera module. The content layer may be a layer which displays content such as a user operation button or user notification, such as an icon or text.

The application framework 220 may provide a function and architecture necessary for operating the application 211. For example, the application framework 220 may include a view system 221 which supports the application 211. The view system 221 may provide a plurality of views to the application 211.

The library 230 may store functions used in various system components. For example, the library 230 may include an OpenGL 231, an HWUI 232, and the like for graphic processing. The HWUI 232 may accelerate the view system 221 through a GPU when generating screen display data of a view (e.g., a user interface (UI) component such as an icon, text, and an image) included in the view system 221. If processing a UI, the HWUI 232 may provide the processed data to the OpenGL 231 and may display the UI through an image processing module 180. If a filter is applied, the HWUI 231 may accelerate the application of the filter and may minimize current consumption.

The kernel 240 may control or manage, for example, system resources (e.g., a bus 110, a processor 120 or a memory 130 of FIG. 1) used to execute an operation or function implemented in other programs. Also, as the application program 210 and the like accesses a separate component of an electronic device 101 of FIG. 1, the kernel 240 may provide an interface which may control or manage system resources. In various embodiments of the present disclosure, the kernel 240 may include a display driver 241. The display driver 241 may merge a plurality of user interface or image layers into one layer and may output the one layer through a display 160. In various embodiments of the present disclosure, the plurality of layers may be merged into one layer through a processor 120 of FIG. 1, the image processing module 180, a DDI (not shown), or an HW compositor (not shown), and the one layer may be output through the display 160.

Figure 3:
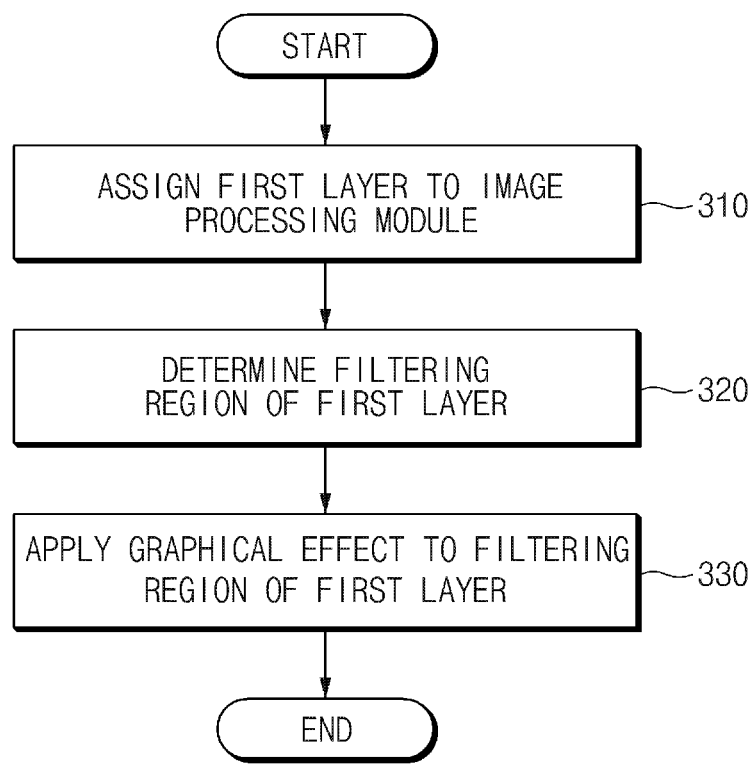
FIG. 3 is a flowchart of an example of a process, according to various embodiments of the present disclosure.

FIG. 3 is a flowchart of an example of a process, according to various embodiments of the present disclosure. In the example of FIG. 3, a first layer and a second layer of a user interface are output on one screen. However, the scope and spirit of the present disclosure may not be limited thereto. For example, three or more layers may be merged into one layer, and the one layer may be output. A processor 120 or an image processing module 180 of FIG. 1 may improve the visibility of content items, such as text content items or icons that are displayed on a background image layer, by applying a filter to at least part of a background image layer through operations 310, 320, and 330.

Referring to FIG. 3, in operation 310, the processor 120 may assign the first layer to the image processing module 180. For example, the first layer may be a background image layer.

In operation 320, the processor 120 may determine a filter region of the first layer according to a position of a content item included in the second layer of the user interface. For example, the second layer may be a content layer including a variety of content items such as text, an image, and an icon. The content item may include at least one of an icon, a text content item, an image, a video, a user interface component, or a group of user interface components.

The processor 120 may identify a region (hereinafter referred to as a "content region") in the second layer which includes the content item. The processor 120 may then select a region in the first layer corresponding to the content region in the second layer as a filter region (e.g., a region that at least partially overlaps with the content region when the two layers are merged). The processor 120 may improve the visibility of content overlapped and output with the filtering region by performing image processing of the filtering region according to a predetermined manner. In various embodiments of the present disclosure, the filtering region may include the content region and may have a larger size than that of the content region.

In operation 330, the image processing module 180 may apply a graphical effect to the filtering region according to a predetermined manner. By applying the graphical effect to the filtering region, the processor 120 (or the image processing module 180) may cause the filtering region to have a color that is different from the color of the content item that is superimposed on the filtering region, thereby making the content item easier to see. The image processing module 180 may perform image processing (e.g., may provide a filtering effect and a gradient effect) of the filtering region according to the set color.

According to various embodiments of the present disclosure, the processor 120 (or the image processing module 180) may extract a representative color from the filtering region and may modify the filtering region according to the extracted representative color.

According to various embodiments of the present disclosure, the processor 120 (or the image processing module 180) may apply a gradient effect to the filtering region. The image processing module 180 may provide a continuous and natural change of a screen by applying the set gradient effect to the filtering region. Information associated with extracting the representative color or applying the gradient effect is provided further below with reference to FIGS. 5 to 7.

According to various embodiments of the present disclosure, the first layer to which the filtering effect is applied and the second layer including the content item may be merged into a combined layer by using at least one of the processor 120, the image processing module 180, a DDI, or an HW compositor, and the combined layer may be output on the display 160. Therefore, the visibility of the content item may be improved by applying a filter to a region in the first layer that is situated underneath the content item.

Figure 4:
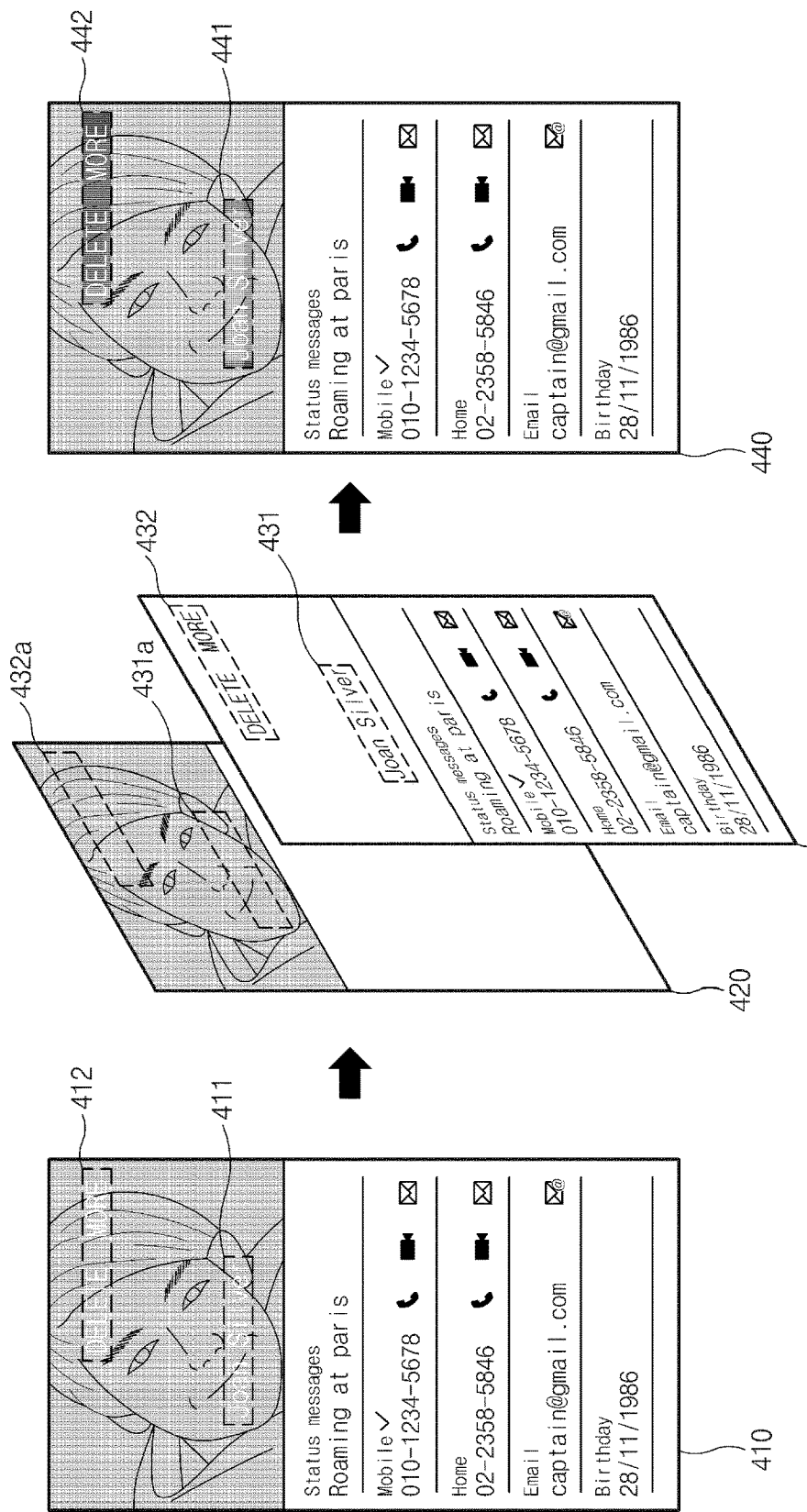
FIG. 4 is a diagram illustrating an example of a process for determining a filtering region, according to various embodiments of the present disclosure.

FIG. 4 is a diagram of an example of a process for determining a filtering region, according to various embodiments of the present disclosure. In FIG. 4, an example is provided in which a screen which outputs an address book application through two layers. However, the scope and spirit of the present disclosure may not be limited thereto.

Referring to FIG. 4, an output screen 410 before being changed may include a first region 411 and a second region 412. For example, the first region 411 may be one which displays a name, and the second region 412 may be one which displays a button (e.g., a 'DELETE' button, a 'MORE' button, and the like).

If a color of a background image is identical or similar to a color of text in the first region 411 and the second region 412, the image or text may be difficult to distinguish from the background image. For example, if text of the first region 411 is white and if a face portion of a photo image which is predominantly white (or light-colored) is used as a background to the text, the user may find it difficult to recognize the text because the text may blend with the background.

The output screen 410 (e.g., a user interface screen) may include a first layer 420 (e.g., a background image layer) and a second layer 430 (e.g., a content layer). In FIG. 4, the first layer 420 may include an image which is used as a background of an address book. The second layer 430 may be a layer which displays information, such as a name, a phone number, and an address stored of different contacts in the address book. Additionally or alternatively, the second layer 430 may include one or more touch buttons (e.g., a 'DELETE' button, a 'MORE' button, and the like).

The processor 120 may detect the position of one or more regions of the second layer 430 (e.g., a first content region 431 and a second content region 432), in which different content items are displayed. The first content region 431 may be a region which includes the name of a given contact, and the second content region 432 may be a region including a touch button.

Thereafter, the processor 120 may select a filtering region corresponding to each of content regions on the first layer 420. More particularly, the processor 120 may identify a first filtering region 431a that is situated underneath the first content region 431 and a second filtering region 432a that is situated underneath the second content region 432. In some implementations, the size of each of the first and second filtering regions 431*a* and 432*a* may be larger than that of each of the first and second content region 431 and 432.

The processor 120 may determine one or more filtering attributes for any of the identified filtering regions. More particularly, the image processing module 180 may increase the visibility of the content items displayed in the content regions 431 and 432 by applying a filter to each of the selected filtering regions (e.g., the first filtering region 431*a* and the second filtering region 432*a*) according to the determined filtering attributes.

In various embodiments of the present disclosure, the processor 120 may extract a representative color from each of the filtering regions and may apply a filtering effect to each of the filtering regions according to the extracted representative color. The processor 120 may ensure that the filtering region blends in with the remainder of the layer 420 and does not stand out excessively by applying a filter to the filtering region that is based on the filtering region's representative color. A user may view displayed content without separately recognizing image conversion details.

In FIG. 4, an embodiment of the present disclosure is provided in which image conversion of an entire filtering region is performed. The scope and spirit of the present disclosure may not be limited thereto. For example, the processor 120 may compare the color of a content item with the color of a filtering region corresponding to the content item and may output a filtering region where it is not difficult to improve visibility, without separate image conversion.

According to various embodiments of the present disclosure, the image processing module 180 may apply to each of the filtering regions in order to apply a graphical effect to each of the filtering regions. The first layer 420 and the second layer 430 may be merged by at least one of the processor 120, the image processing module 180, a DDI, or the HW compositor to produce a screen 440, and the screen 440 may be output.

In the screen 440, readability for each text may be improved by applying a filtering effect to the respective underlying filtering regions of different text items. As illustrated, the background region underlying each text item may be displayed with a relatively dark color in order to distinguish the text from the text's background. However, the processor 120 or the image processing module 180 may apply various graphical effects to each of the filtering regions by adjusting the transparency of an applied representative color and reflecting a gradient effect to each of the filtering regions.

Figure 5:
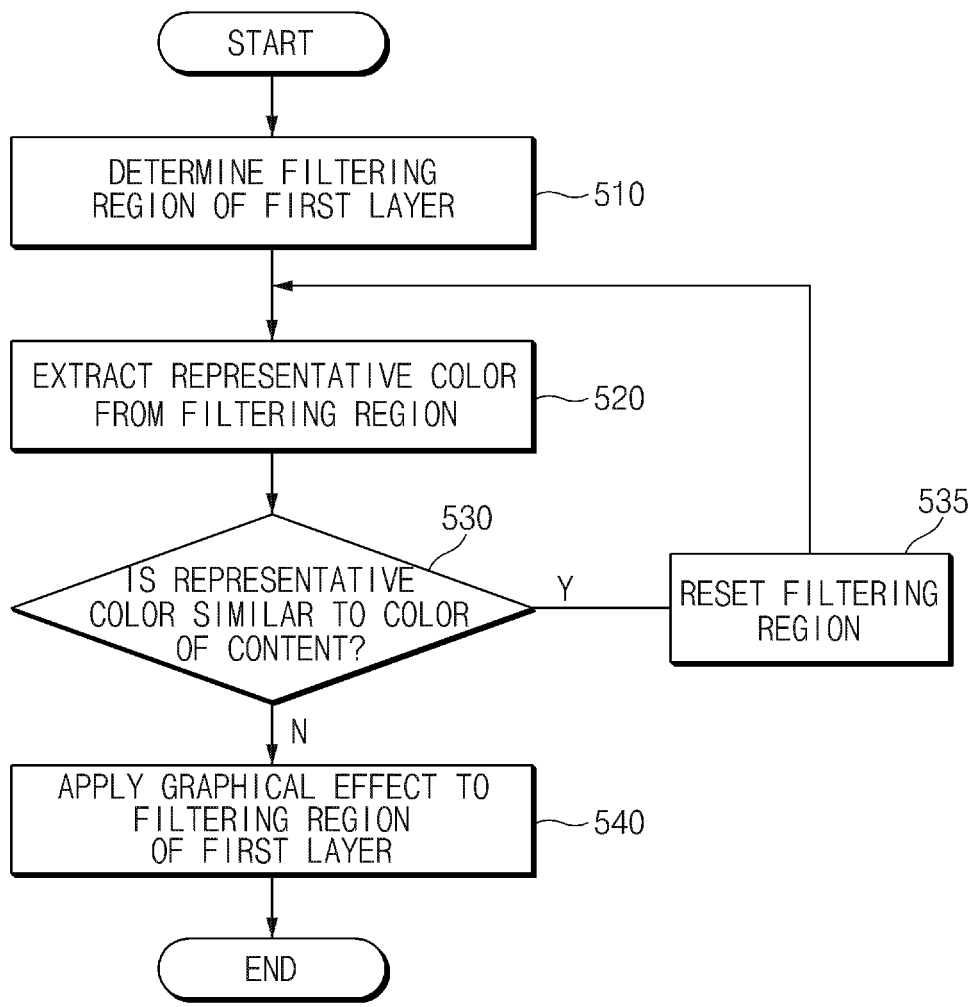
FIG. 5 is a flowchart of an example of a process, according to various embodiments of the present disclosure.

FIG. 5 is a flowchart of an example of a process, according to various embodiments of the present disclosure.

Referring to FIG. 5, in operation 510, a processor 120 of FIG. 1 may determine a filtering region of a first layer according to a position of a content item included in a second layer. The filtering region may be one that is positioned underneath the content item.

In operation 520, the processor 120 may extract a representative color from the filtering region. The representative color may be determined using an average value or a mode of colors assigned to pixels included in each of the filtering regions. In various embodiments of the present disclosure, the processor 120 may sample one or more of the pixels in the filtering region (e.g., may sample some of the pixels according to a reference value or may divide the filtering region into areas and may sample the divided areas) and may use only the sampled pixels without considering the rest. For example, the processor 120 may divide the determined sampling region into areas that are four (4) pixels high and four (4) pixels wide and may determine a representative color for each of the areas according to a color value of only one of the pixels in the area.

In various embodiments of the present disclosure, the processor 120 may calculate an R-average value of pixels included in the filtering region (e.g., the average value of the red component of pixels included in the filtering region), a G-average value of pixels included in the filtering region (e.g., the average value of the green component of pixels included in the filtering region), and a B-average value of pixels included in the filtering region (e.g., the average value of the blue component of pixels included in the filtering region). The processor 120 may determine a representative value by calculating an R brightness value (e.g., the average brightness value of the red component of pixels included in the filtering region), a G brightness value (e.g., the average brightness value of the green component of pixels included in the filtering region), and a B brightness value (e.g., the average brightness value of the blue component of pixels included in the filtering region) and comparing the R brightness value, the G brightness value, and the B brightness value to the R average value, the G average value, and the B average value, respectively. In various embodiments of the present disclosure, if a predetermined representative color is present in the determined filtering region, the processor 120 may determine a predetermined color value as a representative color without a separate process of extracting a representative color.

In operation 530, the processor 120 may determine whether the representative color extracted from the filtering region matches the color of the content item. According to aspects of the disclosure, the representative color that extracted from the filtering region may be considered to match if a distance between the representative color is less than or equal to a reference value. For example, the processor 120 may determine whether the representative color is matched with the color of the content item by 80% or more.

If the extracted representative color is similar to the color of the content item, in operation 535, the processor 120 may reset the filtering region to generate a new filtering region. For example, if the representative color is similar to the color of the content item, the processor 120 may expand the filtering region by a predetermined amount or may expand the other portion except for a content region on the filtering region. Afterwards, the processor 120 may return to operation 520 and extract a representative color of the new filtering region. Alternatively, in some implementations, if a representative color is the same or similar as the color of the content item, the processor 120 may replace the representative color with a predetermined default value.

If the extracted representative color is not similar to the color of the content item, in operation 540, the processor 120 may set filtering attributes to the filtering region using the extracted representative color. The image processing module 180 may provide a filtering effect according to the set filtering attributes.

Figure 6:
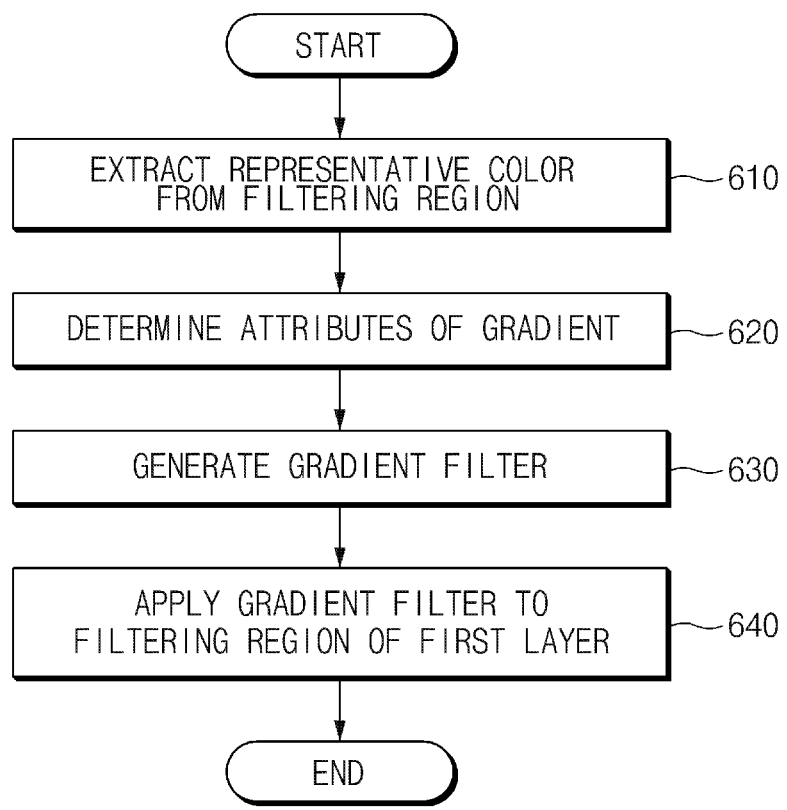
FIG. 6 is a flowchart of an example of a process, according to various embodiments of the present disclosure.

FIG. 6 is a flowchart of an example of a process, according to various embodiments of the present disclosure.

Referring to FIG. 6, in operation 610, a processor 120 of FIG. 1 may extract a representative color from a filtering region in a first layer of a user interface. The representative color may be determined using an average value, a mode, and the like of the filtering region.

In operation 620, the processor 120 may identify attributes of a gradient. More particularly, the processor 120 may retrieve default values for the attributes, or calculate the values of the attributes dynamically. For example, the attributes may be determined based on a type of a content item associated with the filtering region (e.g., a content item that is part of second layer of the user interface and is superimposed over the filtering region when the first layer and the second layer are combined to produce a screen of the user interface), a position of the content item in the second layer, and the like. In various embodiments of the present disclosure, the processor 120 may define attributes such as direction attributes of a gradient, transparency attributes of the gradient, and change height attributes of the gradient.

According to various embodiments of the present disclosure, the direction attributes of the gradient may be determined as an upward and downward direction, a side-to-side direction, a diagonal direction, an edge direction from the center, a center direction from a side, and the like. If a direction of the gradient is set to head towards a center direction from an edge of a screen, the edge of the screen may have the darkest color, and a color may be light when gradually moving to the center of the screen. In various embodiments of the present disclosure, the direction of the gradient may be determined according to a position of the content item in the second layer. For example, if text is displayed above the center of the screen, the direction of the gradient may be determined as a direction which heads towards the center of the screen from an upper edge of the screen, in other words, an upward and downward direction.

In various embodiments of the present disclosure, the transparency attributes of the gradient may be determined according to a type of the content item. For example, if the content item is a text string, a transparency change of 80% may be applied to the filtering region. As another example, if the content item is an icon, a transparency change of 50% may be applied to the filtering region. Settings may be changed to maximize visibility of the content item according to a type of the content item.

In operation 630, the processor 120 may generate a gradient filter according to the determined representative color and the attributes of the gradient.

In operation 640, an image processing module 180 may apply a gradient effect to the filtering region by using the gradient filter.

According to various embodiments of the present disclosure, an image processing method may be performed in an electronic device. The image processing method may include assigning a first layer to an image processing module, determining a filtering region of the first layer according to a position of a content item included in a second layer, and applying a filtering effect to the filtering region.

According to various embodiments of the present disclosure, the applying of the filtering effect may include extracting a representative color from the filtering region, and setting the filtering effect according to the representative color. Also, the extracting of the representative color may include determining the representative color using an average value or a mode of colors assigned to at least some of pixels included in the filtering region. The extracting of the representative color may include resetting a size of the filtering region if the representative color extracted from the filtering region is similar to that of the content item.

According to various embodiments of the present disclosure, the extracting of the representative color may include determining whether to extract the representative color from the filtering region according to an operational characteristic of the electronic device. The operational characteristic may include at least one of a remaining battery life of the electronic device, a computational capacity of the electronic device, a screen brightness, or an amount of current needed for the extraction of the representative color.

According to various embodiments of the present disclosure, the applying of the filtering effect may include setting attributes of a gradient to be applied to the filtering region and applying a gradient effect to the filtering region according to the set attributes. Also, the setting of the attributes of the gradient may include determining direction attributes of the gradient according to a position of the content item. The setting of the attributes of the gradient may include determining transparency attributes of the gradient according to a type of the content item.

According to various embodiments of the present disclosure, the content item may include at least one of an icon, text, a photo, a moving image, or a view (or a user interface component). The image processing module may include at least one of a graphic processing unit (GPU), a DDI, an HW compositor, or an FPGS for performing separate image processing.

Figure 7:
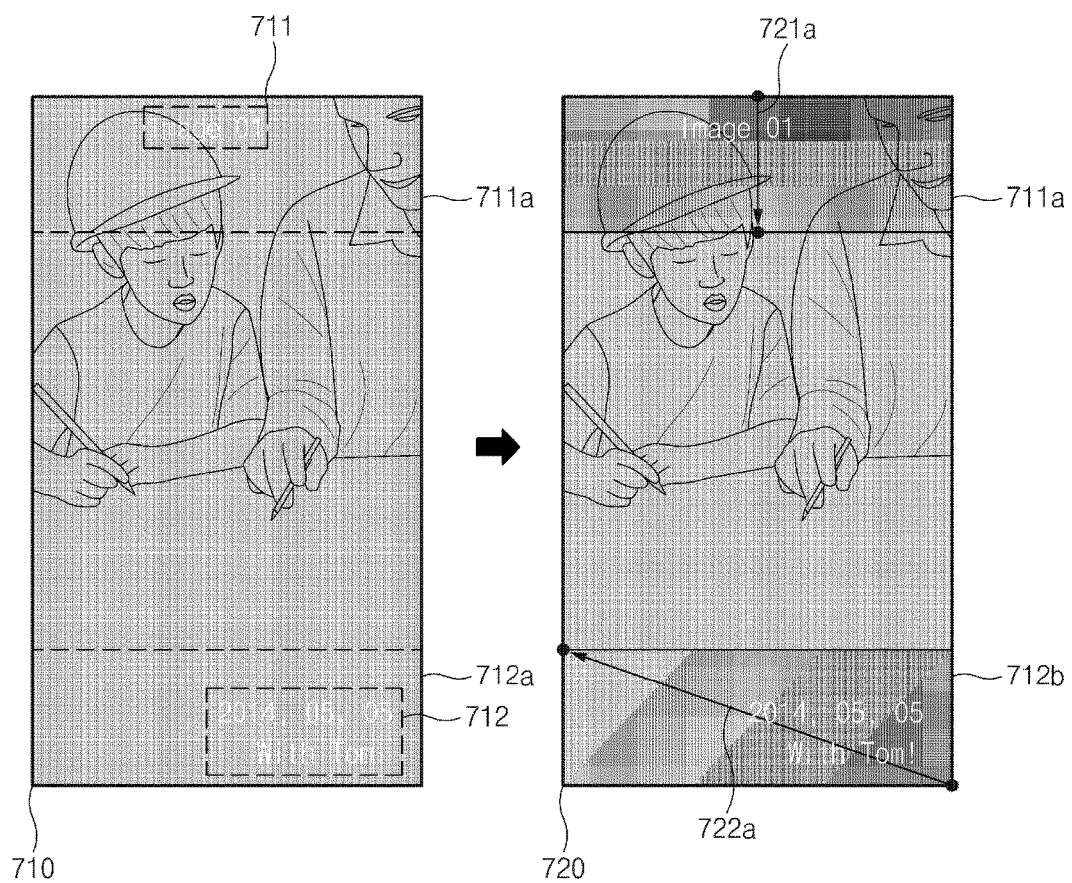
FIG. 7 is a diagram illustrating an example of a process of applying a gradient effect, according to various embodiments of the present disclosure.

FIG. 7 is a diagram of an example of a process for applying a gradient effect, according to various embodiments of the present disclosure.

Referring to FIG. 7, an output screen 710 before being modified may include a first content region 711 and a second content region 712. The first content region 711 may be located above the center of the output screen 710, and the second content region 712 may be located near the lower edge of the output screen 710. If content items (e.g., text items) included in each of the first content region 711 and the second content region 712 have a color similar to that of a background image, the visibility of the content items may be reduced.

In such instances, the processor 120 may determine a respective filtering region for each of the content regions. For example, the processor 120 may identify a first filtering region 711a corresponding to the first content region 711. Also, the processor 120 may identify a second filtering region 712a corresponding to the second content region 712. In various embodiments of the present disclosure, the size of each of the first filtering region 711a and the second filtering region 712a may be larger than the filtering region's respective content region.

The processor 120 may extract a representative color from each of the filtering regions. The processor 120 may increase the contrast between the content item in any the content regions 711 and 712, and the background by applying a graphical effect to the content region's underlying filtering region based on the representative color. Representative colors extracted from the first filtering region 711a and the second filtering region 712a may have different values.

The processor 120 may determine attributes of a gradient for each of the filtering regions. The processor 120 may determine values of attributes such as direction attributes of the gradient, transparency attributes of the gradient, and change height attributes of the gradient. In various embodiments of the present disclosure, the direction attributes of the gradient may be determined according to a position of a content region. For one example, if text included in the first content region 711 is located above the center of the output screen 710, a direction of a gradient may be set to a direction 721a which heads toward a lower end from an upper end of the filtering region 711a. As another example, if text included in the second content region 712 is located near the lower edge of the output screen 710, a direction of the gradient may be set to a diagonal direction 722a which heads towards a left upper end from a right lower end of a screen filtering region 712b.

The processor 120 may generate a gradient filter based on the determined attributes of the gradient filter. An image processing module 180 of FIG. 1 may reflect the gradient effect to a filtering region through the gradient filter. The gradient filter may reduce sense of difference which may occur due to filtering by naturally changing a color of a filtering region.

In various embodiments of the present disclosure, the processor 120 may determine whether to extract a representative color or to apply a gradient effect, according to an operational characteristic of an electronic device 101 of FIG. 1. The operational characteristic may include at least one of a remaining battery life of the electronic device, a computational capacity of the electronic device, a screen brightness, or an amount of current needed for the extraction of the representative color. For example, if the remaining life the battery is less than or equal to a predetermined value, the processor 120 may prevent the battery from being consumed by reducing computation necessary for screen filtering.

Figure 8:
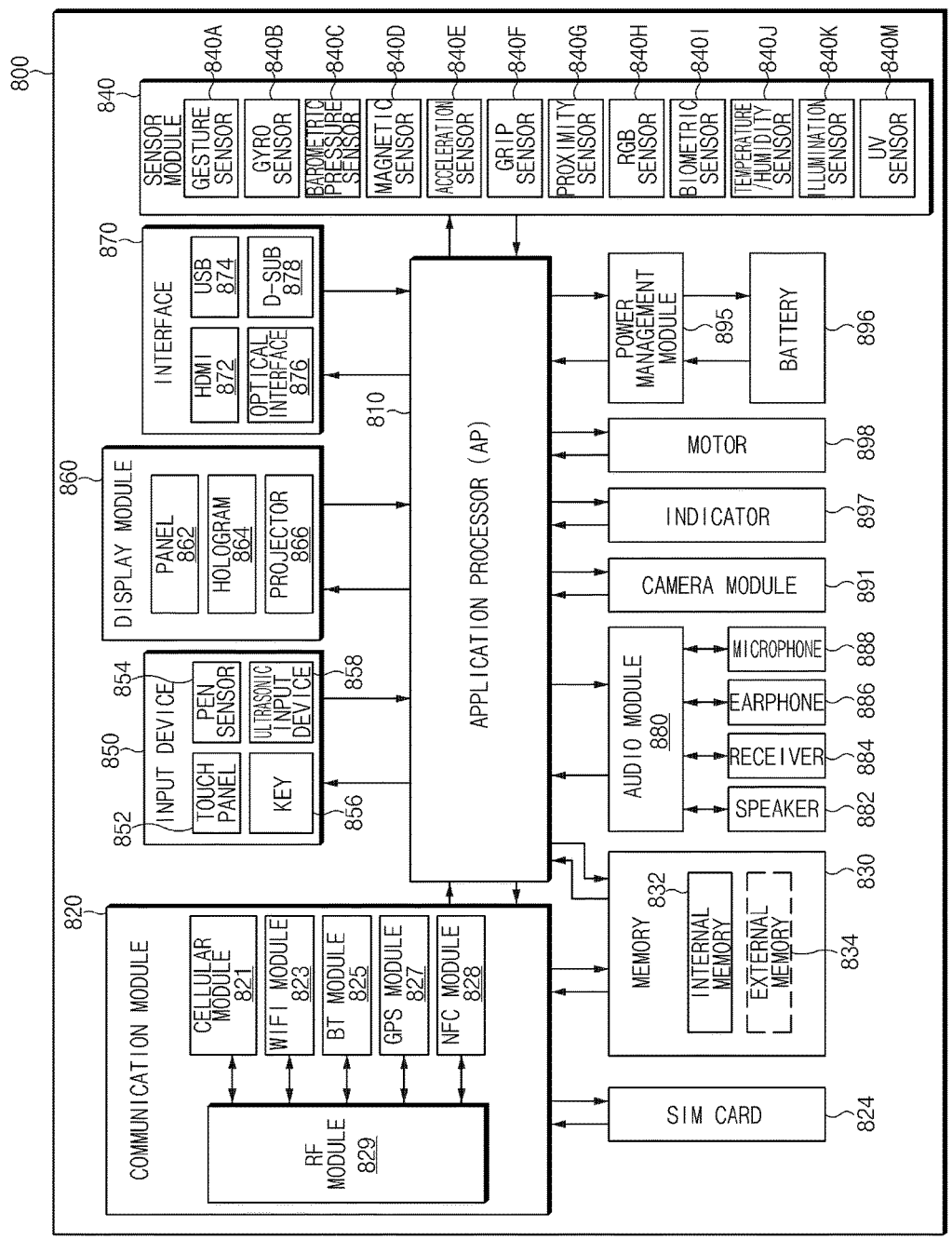
FIG. 8 is a block diagram of an example of an electronic device, according to various embodiments of the present disclosure.

FIG. 8 is a block diagram of an example of an electronic device 800, according to various embodiments of the present disclosure.

Referring to FIG. 8, an electronic device 800 may include, for example, all or part of an electronic device 101 shown in FIG. 1. The electronic device 800 may include one or more processors (e.g., application processors (APs)) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application program to control a plurality of hardware or software components connected thereto and may process and compute a variety of data. The processor 810 may be implemented with, for example, a system on chip (SoC). According to an embodiment of the present disclosure, the processor 810 may further include a graphic processing unit (GPU) (not shown) and/or an image signal processor (not shown). The processor 810 may include at least some (e.g., a cellular module 821) of the components shown in FIG. 8. The processor 810 may load instructions or data received from at least one of other components (e.g., a non-volatile memory) to a volatile memory to process the data and may store various data in a non-volatile memory.

The communication module 820 may have the same or similar configuration as or to that of a communication interface 170 of FIG. 1. The communication module 820 may include, for example, the cellular module 821, a wireless-fidelity (Wi-Fi) module 823, a Bluetooth (BT) module 825, a global positioning system (GPS) module 827, a near-field communication (NFC) module 828, and a radio frequency (RF) module 829.

The cellular module 821 may provide, for example, a voice call service, a video call service, a text message service, or an Internet service, and the like through a communication network. According to an embodiment of the present disclosure, the cellular module 821 may identify and authenticate the electronic device 800 in a communication network using a SIM (e.g., the SIM 824). According to an embodiment of the present disclosure, the cellular module 821 may perform at least part of functions which may be provided by the processor 810. According to an embodiment of the present disclosure, the cellular module 821 may include a communication processor (CP).

The Wi-Fi module 823, the BT module 825, the GPS module 827, or the NFC module 828 may include, for example, a processor for processing data transmitted and received via the corresponding module. According to various embodiments of the present disclosure, at least a part (e.g., two or more) of the cellular module 821, the Wi-Fi module 823, the BT module 825, the GPS module 827, or the NFC module 828 may be included in one integrated chip (IC) or one IC package.

The RF module 829 may transmit and receive, for example, a communication signal (e.g., an RF signal). Though not shown, the RF module 829 may include, for example, a transceiver, a power amplifier module (PAM), a frequency filter, or a low noise amplifier (LNA), or an antenna, and the like. According to another embodiment of the present disclosure, at least one of the cellular module 821, the Wi-Fi module 823, the BT module 825, the GPS module 827, or the NFC module 828 may transmit and receive an RF signal via a separate RF module.

The SIM 824 may include, for example, a card which includes a SIM and/or an embedded SIM. The SIM 824 may include unique identification information (e.g., an integrated circuit card identifier (ICCID)) or subscriber information (e.g., an international mobile subscriber identity (IMSI)).

The memory 830 (e.g., a memory 130 of FIG. 1) may include, for example, an embedded memory 832 or an external memory 834. The embedded memory 832 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid-state drive (SSD)).

The external memory 834 may further include a flash drive, for example, a compact flash (CF), a secure digital (SD), a micro-SD, a mini-SD, an extreme digital (xD), or a memory stick, and the like. The external memory 834 may functionally and/or physically connect to the electronic device 800 through various interfaces.

The sensor module 840 may measure, for example, a physical quantity or may detect an operation state of the electronic device 800, and may convert the measured or detected information to an electric signal. The sensor module 840 may include at least one of, for example, a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illumination sensor 840K, or an ultraviolet (UV) sensor 840M. Additionally or alternatively, the sensor module 840 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 840 may further include a control circuit for controlling at least one or more sensors included therein. According to various embodiments of the present disclosure, the electronic device 800 may further include a processor configured to control the sensor module 1140, as part of the processor 810 or to be independent of the processor 810. While the processor 810 is in a sleep state, the electronic device 800 may control the sensor module 840.

The input device 850 may include, for example, a touch panel 852, a (digital) pen sensor 854, a key 856, or an ultrasonic input unit 858. The touch panel 852 may recognize a touch input using at least one of, for example, a capacitive detecting method, a resistive detecting method, an infrared detecting method, or an ultrasonic detecting method. Also, the touch panel 852 may further include a control circuit. The touch panel 852 may further include a tactile layer and may provide a tactile reaction to a user.

The (digital) pen sensor 854 may be, for example part of a touch panel or may include a separate sheet for recognition. The key 856 may include, for example, a physical button, an optical key, or a keypad. The ultrasonic input unit 858 may allow the electronic device 800 to detect a sound wave using a microphone (e.g., a microphone 888) and to verify data through an input tool generating an ultrasonic signal.

The display 860 (e.g., a display 160 of FIG. 1) may include a panel 862, a hologram device 864, or a projector 866. The panel 862 may include the same or similar configuration as or to that of the display 160. The panel 862 may be implemented to be, for example, flexible, transparent, or wearable. The panel 862 and the touch panel 852 may be integrated into one module. The hologram device 864 may show a stereoscopic image in a space using interference of light. The projector 866 may project light onto a screen to display an image. The screen may be positioned, for example, inside or outside the electronic device 800. According to an embodiment of the present disclosure, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-sub-miniature 878. The interface 870 may be included in, for example, a communication interface 170 shown in FIG. 1. Additionally or alternatively, the interface 870 may include, for example, a mobile high-definition link (MHL) interface, an SD card/multimedia card (MMC) interface, or an infrared data association (IrDA) standard interface.

The audio module 880 may convert a sound and an electric signal in dual directions. At least part of components of the audio module 880 may be included in, for example, an input and output interface 150 shown in FIG. 1. The audio module 880 may process sound information input or output through, for example, a speaker 882, a receiver 884, an earphone 886, or the microphone 888, and the like. The microphone 888 included in the audio module 880 may collect audio data which may be used as input information and remote authentication information or local authentication information.

The camera module 891 may be a device which captures a still image and a moving image. According to an embodiment of the present disclosure, the camera module 891 may include one or more image sensors (not shown) (e.g., a front sensor or a rear sensor), a lens (not shown), an image signal processor (ISP) (not shown), or a flash (not shown) (e.g., an LED or a xenon lamp).

The power management module 895 may manage, for example, the power supply of the electronic device 800. According to an embodiment of the present disclosure, though not shown, the power management module 895 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 896 and voltage, current, or temperature thereof while the battery 896 is charged. The battery 896 may include, for example, a rechargeable battery or a solar battery.

The indicator 897 may display a specific state of the electronic device 800 or part (e.g., the processor 810) thereof, for example, a booting state, a message state, or a charging state, and the like. The motor 898 may convert an electric signal into mechanical vibration and may generate vibration or a haptic effect, and the like. Though not shown, the electronic device 800 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a media flow standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

According to various embodiments of the present disclosure, the electronic device may include an image processing module, a display, and a processor configured to assign a first layer to the image processing module. The processor may determine a filtering region of the first layer according to a position of content included in the second layer. The image processing module may apply a graphical effect to the filtering region. The display may output a screen according to the first layer and the second layer.

According to various embodiments of the present disclosure, the processor may extract a representative color from the filtering region and may set the graphical effect according to the representative color. The processor may determine the representative color using an average value or a mode of colors assigned to at least some of pixels included in the filtering region.

According to various embodiments of the present disclosure, the processor may set attributes of a gradient to be applied to the filtering region. The image processing module may apply a gradient effect according to the set attributes to the filtering region.

Figure 9:
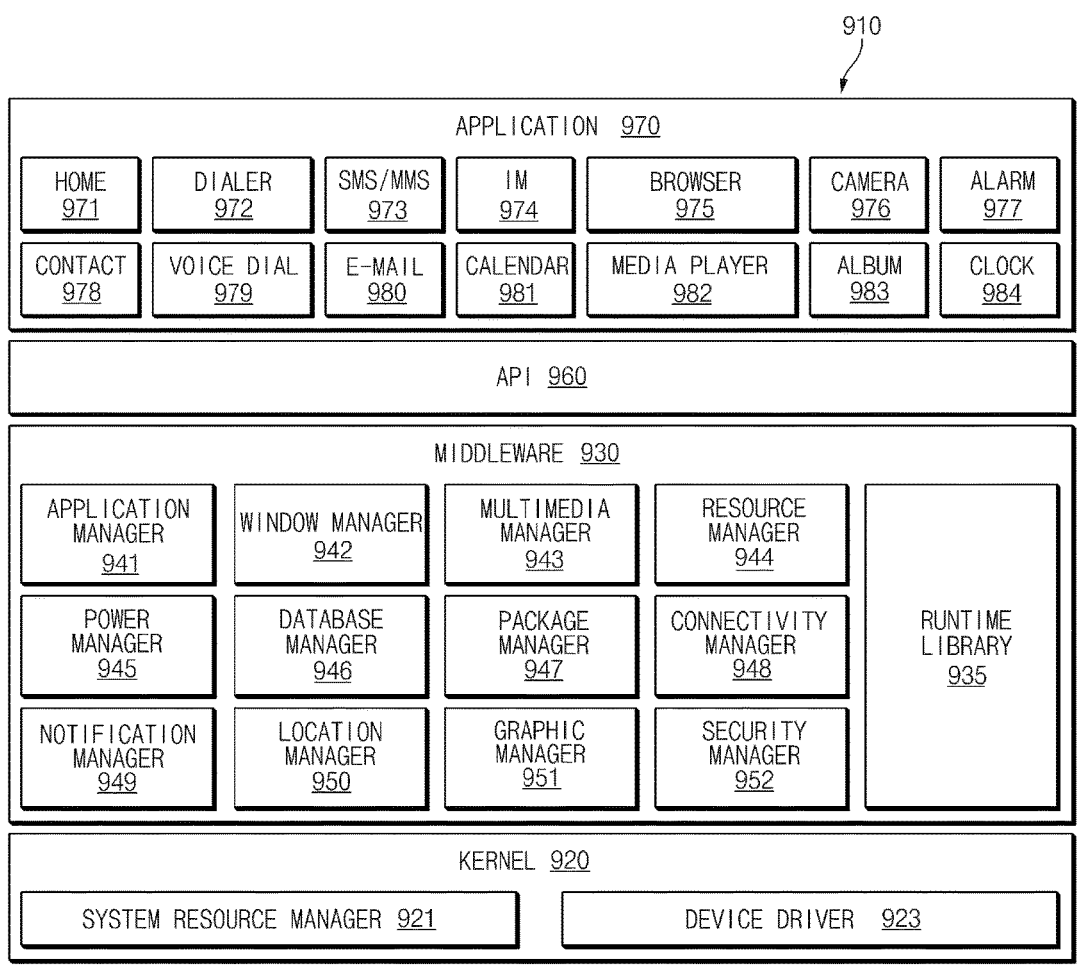
FIG. 9 is a block diagram illustrating an example of a program module, according to various embodiments of the present disclosure.

FIG. 9 is a block diagram of an example of a program module 910, according to various embodiments of the present disclosure.

Referring to FIG. 9, according to an embodiment of the present disclosure, the program module 910 (e.g., a program module 201 of FIG. 2) may include an operating system (OS) for controlling resources associated with an electronic device (e.g., an electronic device 101 of FIG. 1) and/or various applications (e.g., an application program 210 of FIG. 2) which are executed on the OS. The OS may be, for example, Android, iOS, Windows, Symbian, Tizen, or Bada, and the like.

The program module 910 may include a kernel 920, a middleware 930, an application programming interface (API) 960, and/or an application 970. At least part of the program module 910 may be preloaded on the electronic device, or may be downloaded from an external electronic device.

The kernel 920 (e.g., a kernel 240 of FIG. 2) may include, for example, a system resource manager 921 and/or a device driver 923. The system resource manager 921 may control, assign, or collect, and the like system resources. According to an embodiment of the present disclosure, the system resource manager 921 may include a process management unit, a memory management unit, or a file system management unit, and the like. The device driver 923 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 930 (e.g., a library 230 of FIG. 2) may provide, for example, functions the application 970 needs in common, and may provide various functions to the application 970 through the API 960 such that the application 970 efficiently uses limited system resources in the electronic device. According to an embodiment of the present disclosure, the middleware 930 may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The runtime library 935 may include, for example, a library module used by a compiler to add a new function through a programming language while the application 1070 is executed. The runtime library 935 may perform a function related to input and output management, memory management, or an arithmetic function.

The application manager 941 may manage, for example, a life cycle of at least one of the application 970. The window manager 942 may manage graphic user interface (GUI) resources used on a screen of the electronic device. The multimedia manager 943 may ascertain a format necessary for reproducing various media files and may encode or decode a media file using a codec corresponding to the corresponding format. The resource manager 944 may manage source codes of at least one of the application 970, and may manage resources of a memory or a storage space, and the like.

The power manager 945 may act together with, for example, a basic input/output system (BIOS) and the like, may manage a battery or a power source, and may provide power information necessary for an operation of the electronic device. The database manager 946 may generate, search, or change a database to be used in at least one of the application 970. The package manager 947 may manage installation or update of an application distributed by a type of a package file.

The connectivity manager 948 may manage, for example, wireless connection such as Wi-Fi connection or BT connection, and the like. The notification manager 949 may display or notify events, such as an arrival message, an appointment, and proximity notification, by a method which is not disturbed to the user. The location manager 950 may manage location information of the electronic device. The graphic manager 951 may manage a graphic effect to be provided to the user or a user interface (UI) related to the graphic effect. The security manager 952 may provide all security functions necessary for system security or user authentication, and the like. According to an embodiment of the present disclosure, when the electronic device (e.g., the electronic device 101) has a phone function, the middleware 930 may further include a telephony manager (not shown) for managing a voice or video communication function of the electronic device.

The middleware 930 may include a middleware module which configures combinations of various functions of the above-described components. The middleware 930 may provide a module which specializes according to kinds of OSs to provide a differentiated function. Also, the middleware 930 may dynamically delete some of old components or may add new components.

The API 960 (e.g., an application framework 220 of FIG. 2) may be, for example, a set of API programming functions, and may be provided with different components according to OSs. For example, in case of Android or iOS, one API set may be provided according to platforms. In case of Tizen, two or more API sets may be provided according to platforms.

The application 970 (e.g., the application program 210) may include one or more of, for example, a home application 971, a dialer application 972, a short message service/multimedia message service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a clock application 984, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 970 may include an application (hereinafter, for better understanding and ease of description, referred to as "information exchange application") for exchanging information between the electronic device (e.g., the electronic device 101) and an external electronic device. The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device. Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device which communicates with the electronic device, an application which operates in the external electronic device, or a service (e.g., a call service or a message service) provided by the external electronic device.

According to an embodiment of the present disclosure, the application 970 may include an application (e.g., the health card application of a mobile medical device) which is preset according to attributes of the electronic device. According to an embodiment of the present disclosure, the application 970 may include an application received from the external electronic device. According to an embodiment of the present disclosure, the application 970 may include a preloaded application or a third party application which may be downloaded from a server. Names of the components of the program module 910 according to various embodiments of the present disclosure may differ according to kinds of OSs.

According to various embodiments of the present disclosure, at least part of the program module 910 may be implemented in software, firmware, hardware, or at least two or more combinations thereof. At least part of the program module 910 may be implemented (e.g., executed) by, for example, a processor (e.g., a processor 810 of FIG. 8). At least part of the program module 910 may include, for example, a module, a program, a routine, sets of instructions, or a process, and the like for performing one or more functions.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The term "module" may refer, for example, a unit including one of hardware, software, and firmware or two or more combinations thereof. The term "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of the electronic device (e.g., modules or the functions) or the method (e.g., operations) may be implemented with, for example, instructions stored in a computer-readable storage media storing a program module. When the instructions are executed by a processor (e.g., a processor 120 of FIG. 1), one or more processors may perform functions corresponding to the instructions. The computer-readable storage media may be, for example, a memory 130 of FIG. 1. According to aspects of the disclosure, program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included.

According to various embodiments of the present disclosure, the electronic device may improve visibility for content on a screen, if outputting a user interface (UI) through the image processing module such as the GPU.

According to various embodiments of the present disclosure, the electronic device may perform high-speed filter computation without an additional load in the memory, since a separate layer is not added.

FIGS. 1-9 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

And, embodiments of the present disclosure described and shown in the drawings are provided as examples to describe technical content and help understanding but do not limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. A method for use in an electronic device, comprising:
   selecting a filtering region in a first layer of a user interface based on a position of a content item in a second layer of the user interface;
   extracting a representative color from the filtering region;
   determining whether the representative color substantially matches a color of the content item;
   when the representative color substantially matches the color of the content item:
      expanding an area of the filtering region; and
      iteratively repeating the extracting, the determining, and the expanding until the representative color is dissimilar from the color of the content item;
   applying a graphical effect to the filtering region based on the representative color that is dissimilar from the color of the content item to increase a color contrast between the filtering region and the content item; and
   displaying, on a display of the electronic device, a screen that is produced by merging the first layer with the second layer after the graphical effect is applied to the filtering region.

2. The method of claim 1, wherein the representative color is extracted based on an average value or a mode of colors assigned to one or more pixels in the filtering region.

3. The method of claim 1, wherein the representative color is extracted from the filtering region in response to an operational characteristic of the electronic device satisfying a predetermined condition.

4. The method of claim 3, wherein the operational characteristic comprises at least one of remaining battery life, available processing capacity, screen brightness, and an amount of power necessary for extracting the representative color.

5. The method of claim 1, wherein:
   the graphical effect includes a gradient effect,
   applying the graphical effect includes identifying at least one attribute of a gradient associated with the gradient effect, and
   the graphical effect is applied based on the at least one attribute of the gradient.

6. The method of claim 5, wherein:
   the at least one attribute of the gradient is a direction of the gradient, and
   the direction of the gradient is identified according to the position of the content item in the second layer.

7. The method of claim 5, wherein:
   the at least one attribute of the gradient is a transparency attribute, and
   the transparency attribute is identified according to a type of the content item.

8. The method of claim 1, wherein the content item comprises at least one of an icon, text, a photo, a video, and a user interface component.

9. The method of claim 1, further comprising assigning the first layer to an image processing module of the electronic device, wherein the image processing module comprises at least one of a graphic processing unit (GPU), a display driver integrated circuit (DDI), a hardware (HW) compositor, and a field programmable gate array (FPGA).

10. The method of claim 1, wherein the representative color is extracted by:
    determining an R-average value of a red component of one or more pixels in the filtering region, a G-average value of a green component of the one or more pixels in the filtering region, and a B-average value of a blue component of the one or more pixels in the filtering region;
    determining a R-brightness value of the red component of the one or more pixels in the filtering region, a G-brightness value of the green component of the one or more pixels in the filtering region, and a B-brightness value of the blue component of the one or more pixels in the filtering region; and
    comparing the R-brightness value, G-brightness value, and B-brightness value to the R-average value, G-average value, and B-average value, respectively.

11. An electronic device, comprising:
    a display;
    a memory;
    an image processing module; and
    at least one processor operatively coupled to the memory;
    wherein the at least one processor is configured to:
       select a filtering region in a first layer of a user interface based on a position of a content item in a second layer of the user interface,
       extract a representative color from the filtering region,
       determine whether the representative color substantially matches a color of the content item,
       when the representative color substantially matches the color of the content item:
          expand an area of the filtering region, and
          iteratively repeat the extracting, the determining, and the expanding until the representative color is dissimilar from the color of the content item,
    wherein the image processing module is configured to apply a graphical effect to the filtering region based on the representative color that is dissimilar from the color of the content item to increase a color contrast between the filtering region and the content item, and
    wherein the display is configured to display a screen that is produced by merging the first layer with the second layer after the graphical effect is applied to the filtering region.

12. The electronic device of claim 11, wherein the representative color is extracted based on an average value or a mode of colors assigned to one or more pixels in the filtering region.

13. The electronic device of claim 11, wherein:
    the graphical effect includes a gradient effect,
    applying the graphical effect includes identifying at least one attribute of a gradient associated with the gradient effect, and
    the graphical effect is applied based on the at least one attribute of the gradient.

14. A non-transitory computer-readable medium comprising one or more processor-executable instructions which when executed by at least one processor cause the at least one processor to perform a method comprising the steps of:
    selecting a filtering region in a first layer of a user interface based on a position of a content item in a second layer of the user interface;
    extracting a first representative color from the filtering region;
    determining whether the representative color substantially matches a color of the content item;
    when the representative color substantially matches the color of the content item:
       expanding an area of the filtering region; and iteratively repeating the extracting, the determining, and the expanding until the representative color is dissimilar from the color of the content item;

applying a graphical effect to the filtering region based on the representative color that is dissimilar from the color of the content item to increase a color contrast between the filtering region and the content item; and displaying a screen that is produced by merging the first layer with the second layer after the graphical effect is applied to the filtering region.

* * * * *